United States Patent
Gritsenko et al.

(10) Patent No.: US 9,367,924 B2
(45) Date of Patent: Jun. 14, 2016

(54) METHOD AND SYSTEM FOR SEGMENTATION OF THE LIVER IN MAGNETIC RESONANCE IMAGES USING MULTI-CHANNEL FEATURES

(71) Applicant: Siemens Aktiengesellschaft, Munich (DE)

(72) Inventors: Artem Gritsenko, Stavropol (RU); Neil Birkbeck, Sunnyvale, CA (US); Jingdan Zhang, Bellevue, WA (US); Shaohua Kevin Zhou, Plainsboro, NJ (US)

(73) Assignee: Siemens Aktiengesellschaft, Munich (DE)

( * ) Notice: Subject to any disclaimer, the term of this patent is extended or adjusted under 35 U.S.C. 154(b) by 72 days.

(21) Appl. No.: 14/270,624

(22) Filed: May 6, 2014

(65) Prior Publication Data

US 2015/0324999 A1    Nov. 12, 2015

(51) Int. Cl.
*G06K 9/00* (2006.01)
*G06T 7/00* (2006.01)
*G06K 9/62* (2006.01)

(52) U.S. Cl.
CPC ............ *G06T 7/0097* (2013.01); *G06K 9/6259* (2013.01); *G06T 7/0089* (2013.01); *G06T 2207/10088* (2013.01); *G06T 2207/20116* (2013.01); *G06T 2207/30056* (2013.01)

(58) Field of Classification Search
None
See application file for complete search history.

(56) References Cited

U.S. PATENT DOCUMENTS

| | | | |
|---|---|---|---|
| 7,684,643 B2 * | 3/2010 | Chen | G06T 5/50 341/107 |
| 7,840,044 B2 | 11/2010 | Ma et al. | |
| 7,907,777 B2 * | 3/2011 | Aharon | G06K 9/6232 382/173 |
| 7,916,919 B2 | 3/2011 | Zheng et al. | |
| 8,073,220 B2 | 12/2011 | Khamene et al. | |
| 8,090,180 B2 | 1/2012 | Maier et al. | |
| 8,131,038 B2 | 3/2012 | Saddi et al. | |
| 8,175,354 B2 | 5/2012 | Liang et al. | |
| 8,229,188 B2 | 7/2012 | Rusko et al. | |
| 8,447,085 B2 | 5/2013 | Gloger | |
| 8,750,585 B2 | 6/2014 | Liu | |
| 8,879,810 B2 * | 11/2014 | Feng | G06T 7/0014 378/21 |
| 8,934,693 B2 * | 1/2015 | Grbic | G06T 7/0012 382/131 |
| 2006/0241381 A1 * | 10/2006 | Wang | G01R 33/4828 600/410 |
| 2007/0270692 A1 * | 11/2007 | Barbu | A61B 6/12 600/431 |
| 2009/0003672 A1 | 1/2009 | Maier et al. | |
| 2009/0052756 A1 | 2/2009 | Saddi et al. | |
| 2009/0097726 A1 | 4/2009 | Rusko et al. | |
| 2010/0111390 A1 * | 5/2010 | Fenchel | G06K 9/6292 382/131 |
| 2010/0195885 A1 * | 8/2010 | Ma | G01R 33/4828 382/131 |
| 2011/0044523 A1 * | 2/2011 | Gloger | G06T 7/0081 382/131 |
| 2011/0052028 A1 | 3/2011 | Shreiber | |
| 2011/0116698 A1 * | 5/2011 | Weis | G06K 9/6207 382/131 |
| 2011/0243386 A1 * | 10/2011 | Sofka | G06K 9/6278 382/103 |
| 2012/0070055 A1 | 3/2012 | Liu et al. | |
| 2012/0207366 A1 | 8/2012 | Liu | |
| 2014/0161334 A1 * | 6/2014 | Wang | G06K 9/00362 382/131 |

* cited by examiner

*Primary Examiner* — Avinash Yentrapati (57) ABSTRACT

A method and system for fully automatic liver segmentation in a multi-channel magnetic resonance (MR) image is disclosed. An initial liver boundary in the multi-channel MR image, such as an MR Dixon scan. The segmented initial liver boundary in the multi-channel MR image is refined based on features extracted from multiple channels of the multi-channel MR image using a trained boundary detector. The features may be extracted from an opposed channel and a water channel of an MR Dixon scan.

22 Claims, 5 Drawing Sheets

METHOD AND SYSTEM FOR SEGMENTATION OF THE LIVER IN MAGNETIC RESONANCE IMAGES USING MULTI-CHANNEL FEATURES

BACKGROUND OF THE INVENTION

The present invention relates to segmentation of the liver in medical images, and more particularly, to automatic segmentation of the liver in magnetic resonance images using multi-channel features.

Segmentation of anatomical structures, such as the liver, in medical images is a fundamental building block in many clinical workflows. Manual delineation of the liver in medical images can be a challenging and time-consuming task, and there can be significant inter-user and intra-user variability among manual segmentations of the liver. Common to all medical imaging modalities, the problem of segmenting the liver is challenging due to shaper or organ variability. In computed tomography (CT) images, the intensities in the image are measured in the common Hounsfield units, making it easier to rely on organ specific intensity priors for organ segmentation. In contrast, the units for measuring intensity in magnetic resonance (MR) images vary in different scans, so such global intensity cues cannot be relied on for organ segmentation in MR images. Accordingly, a method for fully automatically segmentation of the liver in MR images is desirable.

BRIEF SUMMARY OF THE INVENTION

The present invention provides a method and system for automatically segmenting the liver in magnetic resonance (MR) images using multi-channel features. A magnetic resonance imaging (MRI) examination may include several MR sequences, each of which is chosen to provide a particular type of information about the tissues of interest, resulting in multi-channel MR images. Embodiments of the present invention provide fully automatic segmentation of the liver using discriminative learning based framework capable of information available in various channels of a multi-channel MR image. Rather than using a single input image for segmentation cues, embodiments of the present invention utilize statistical classifiers and a training database of liver shapes to establish the relationship between features from multiple input MR image channels and the liver boundary.

In one embodiment, an initial liver boundary is segmented in a multi-channel MR image. The segmented initial liver boundary in the multi-channel MR image is refined based on features extracted from multiple channels of the multi-channel MR image using a trained boundary detector.

These and other advantages of the invention will be apparent to those of ordinary skill in the art by reference to the following detailed description and the accompanying drawings.

DETAILED DESCRIPTION

The present invention is directed to a method and system for fully automatic segmentation of the liver in magnetic resonance (MR) images using multi-channel features. Embodiments of the present invention are described herein to give a visual understanding of the liver segmentation method. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system.

Embodiments of the present invention are directed to fully automated liver segmentation in multi-channel MR images. An MRI examination may include several sequences, each of which is chosen to provide a particular type of information, resulting in a multi-channel MR image. A multi-channel MR image is composed of vector-valued intensity values, i.e., multiple scalar intensity values (one for each channel) per voxel. Different MR channels may emphasize on different tissue characteristics providing additional information about the depicted image content. In order to achieve automated liver segmentation with high accuracy, embodiments of the present invention provide reliable algorithms for fusing cues in multiple input MR channels. In particular, embodiments of the present invention provide a discriminative learning-based framework capable of utilizing information provided in various channels of a multi-channel MR image. Rather than using a single input image for segmentation cues, embodiments of the present invention utilize statistical classifiers and a training database of liver shapes to establish a relationship between multiple input MR channels and the liver boundary.

According to an advantageous embodiment, the complicated learning task can be broken up into manageable components using Marginal Space Learning (MSL) for pose estimation, which is followed by fine-scale boundary localization to improve the liver segmentation results. Unlike in CT or single channel MR, at each stage in the pipeline, features sampled from multiple input channels are utilized, as the different channels have different distinctive parts. The multi-channel features can better represent the borders of the liver in the MR images.

Figure 1:
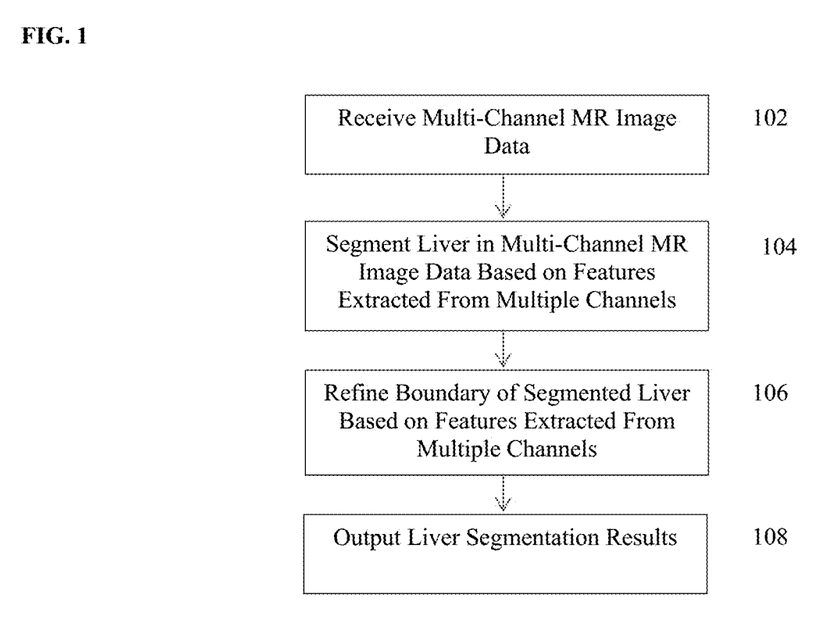
FIG. 1 illustrates a method of automatically segmenting the liver in multi-channel MR images using multi-channel features according to an embodiment of the present invention.

FIG. 1 illustrates a method of automatically segmenting the liver in multi-channel MR images using multi-channel features according to an embodiment of the present invention. The method of FIG. 1 transforms multi-channel MR image data representing a portion of a patient's anatomy to segment the patient's liver in the MR image data.

At step 102, a multi-channel MR image is received. The multi-channel MR image is an image that has at least two channels of MR image data. The multi-channel MR image is composed of vector-valued intensity values, i.e., multiple scalar intensity values (one for each channel) per voxel. The multi-channel MR image can include MR channels acquired using an MR scanner, as well as MR channels generated as a linear combination of MR channels acquired using an MR scanner. The multi-channel MR image may be received directly from an MR scanner or the multi-channel MR image may be received by loading stored multi-channel MR image data.

In an exemplary embodiment, the liver can be segmented in 3D multi-channel MR images acquired using the MR Dixon scanning protocol. Due to different chemical environments, hydrogen nuclei in water-tissue and in fat tissue have different values for some MRI relevant parameters, such as the relaxation time and the resonance frequency (chemical shift). These differences can be used to selectively suppress or reduce the signal of fat bound protons. Thus relaxation-dependent and chemical shift-dependent methods can be used for fat suppression.

Figure 2:
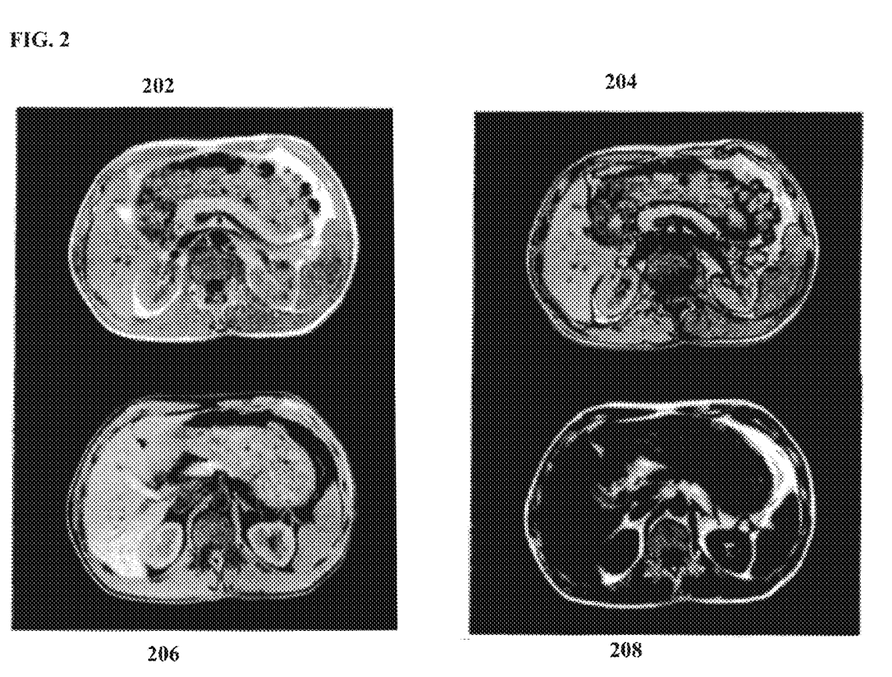
FIG. 2 illustrates exemplary multi-channel MR images of the liver acquired using the MR Dixon protocol.

The Dixon technique is based on the chemical shift, i.e., the difference is resonance frequencies between fat-bound and water-bound protons. With this technique, two images are acquired: in the first image, the signal from fat-protons and the signal from water-protons are "in phase", and in the second image, the signal from fat-protons and the signal from water-protons are "oppose phase". By additional computations, a separate fat image and water image are calculated. The water image is the sum of the in phase and opposed images. The fat image is generated by subtracting the opposed image from the in-phase image. FIG. 2 illustrates exemplary multi-channel MR images of the liver acquired using the MR Dixon protocol. As shown in FIG. 2, image 202 is the in-phase image, image 204 is the opposed-phase image, image 206 is the water image, and image 208 is the fat image. It can be seen in FIG. 2 that the boundaries between organs in the opposed image 204 are clearly delineated by dark lines of fat. The parenchyma of the kidneys seems brighter in the opposed image 204 than in the in-phase image 202. The left kidney is much easier to see in the opposed image 204 than in the in-phase image 202. The spinal canal is more easily seen in the water image 206. Accordingly, different parts are more easily recognizable in different channels. According to an advantageous implementation, a multi-channel MR image including the opposed image and the water image can be used for liver segmentation. Although additional channels can be used as well, it can be noted that in MR Dixon images, using more than two channels may be redundant because there are only two original channels (opposed and in-phase) and the other two channels (water and fat) are linear combinations of the original channels.

Returning to FIG. 1, at step 104, the liver is segmented in the multi-channel MR image based on features extracted from multiple channels of the multi-channel MR image. The liver can be segmented using a discriminative learning segmentation algorithm based on features extracted from multiple channels of the multi-channel MR image. In particular, one or more trained discriminative classifiers, which are trained using multi-channel features extracted from annotated training data, can be used to detect the liver in the received multi-channel MR image based on the multi-channel features extracted from the received multi-channel MR image.

In an advantageous embodiment, the liver is segmented using marginal space learning (MSL) segmentation based on features extracted from multiple channels of the multi-channel MR image. Although the use of MSL to combine responses from multiple channels is described herein, the present invention is not limited thereto and other machine learning based methods may also be used to combine the features from multiple channels in order to segment the liver. In MSL, a set of discriminative classifiers are used to estimate the pose of the liver as a sequence of classifier evaluations. MSL-based 3D object detection estimates the position, orientation, and scale of the target anatomical structure in the 3D medical image data using a series of discriminative classifiers trained using annotated training data. For example, a method for MSL-based heart chamber segmentation is described in detail in U.S. Pat. No. 7,916,919, issued Mar. 29, 2011, and entitled "System and Method for Segmenting Chambers of a Heart in a Three Dimensional Image", which is incorporated herein by reference. In order to efficiently localize an object using MSL, parameter estimation is performed in a series of marginal spaces with increasing dimensionality. Accordingly, the idea of MSL is not to learn a classifier directly in the full similarity transformation space, but to incrementally learn classifiers in the series of marginal spaces. As the dimensionality increases, the valid space region becomes more restricted by previous marginal space classifiers. Accordingly, instead of searching for all parameters simultaneously, MSL decomposes the search space into subsequent estimates of 3D searches over position, orientation, and scale. In particular, given an input image I, the pose Pose (t, r, s) of the liver is broken down to a sequence of estimates of position t, orientation r, and scale s:

$Pr(Pose|I)=Pr(t|I)Pr(r|I, t)Pr(s|I, t, r)$.

At each phase of the process, a binary classifier is used to estimate the posterior probability. For example, for the position detection phase:

$Pr(t|I)=Pr(y=1|I, t)$, where y is a binary random variable taking on a value of 1 if the local context around the position t in the image is the actual center position of the object of interest (i.e., the liver). The other phases (orientation and scale) are decomposed into a similar estimation process. After each step, only a limited number of best candidates are kept to reduce the search space and speed up the inference. A separate discriminative classifier is trained based on annotated training data for each of these steps. In the position estimation step, a trained position classifier is used to detect a set of most likely position candidates in the current medical image data. In the position-orientation estimation step, a trained position-orientation classifier searches number of plausible orientations at each of the position candidates to detect a set of most likely position-orientation candidates. In the full similarity transformation estimation step, a trained position-orientation-scale classifier searches number of plausible scales at each of the position-orientation candidates to detect a set of most likely position-orientation-scale candidates. The discriminative classifier for each phase (position, position-orientation, and position-orientation-scale) is trained to learn a statistical relationship by examining a large training set of position and negative training examples and chooses features from a pool of multi-channel features that best separate the positive and negative training examples. In an advantageous implementation, each discriminative classifier can a probabilistic boosting tree (PBT) classifier, but the present invention is not limited thereto and other greedy and random classifiers, such as random forests, can be used as well.

In order to use multiple channels from the input image, a set of features are extracted from the multiple channels and used by the discriminative classifier in each phase of the MSL segmentation. Different feature types can be used for different phases of the MSL segmentation. For position estimation, Haar wavelet features can be used. These features can include Haar features extracted from all input image channels, as well as linear combinations of the Haar features extracted from the image channels. Steerable features extracted from multiple channels of the MR image can be used for the orientation and scale detection phases. Once the position, orientation, and scale are detected for the liver using MSL, a mean liver mesh generated from the training data is fit to the multi-channel MR image using the detected position, orientation, and scale in order to define an initial segmentation of the liver in the multi-channel MR image.

At step 106, the boundary of the segmented liver in the multi-channel MR image is refined based on features extracted from multiple channels of the multi-channel MR image. The position, orientation, and scale detection of the liver in the MR image can benefit from multiple channel features, but the segmentation in step 104 only provides an initialization of a liver mesh. As the multiple image channels have different fine-scale borders, the use of the multiple channels (e.g., the opposed channel and the water channel of an MR Dixon scan) in a discriminative learning approach ensures that the best features from all input channels are incorporated into the feature vector that guides the boundary refinement segmentation.

The boundary refinement starts with the initialized position, orientation, and scale detected in step 104. The shape of the liver is represented as a closed triangle mesh M and a hierarchical shape model is generated from the mesh M by applying a downsampling process to the mesh M to generate a downsampled mesh $M^0$. Starting with the downsampled mesh $M^0$, a shape pyramid is generated by recursively applying the downsampling process, such that meshes at different pyramid layers correspond to volumes at different resolutions.

Figure 3:
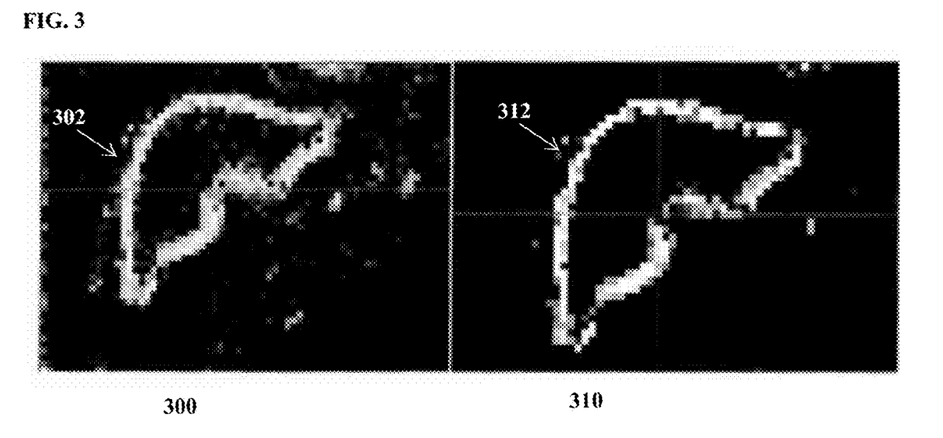
FIG. 3 illustrates exemplary probability maps for the liver boundary refinement.

From the initialized mesh, a candidate set point $Q_p$ for each boundary point p is generated by sampling all points in the image along a normal direction at p within a predetermined range. The probability response for each point in $Q_p$ is then calculated based on features extracted from multiple channels of the multi-channel MR image using a trained boundary detector. The trained boundary detector is a discriminative classifier, such as a PBT classifier, trained based annotated training data using multi-channel features. In an advantageous implementation, steerable features are extracted from each channel of the multi-channel MR image and used by the trained boundary detector to calculate the probability for each point in $Q_p$. At each sampling point, a set of local features is extracted based on image intensity and gradient. In an exemplary embodiment, given a sample point (x, y, z), if its intensity is I and the gradient is $g=(g_x, g_y, g_z)$, the following features are extracted: I, $\sqrt{I}$, $I^2$, $I^3$, log I, $g_x$, $g_y$, $g_z$, $\|g\|$, $\sqrt{\|g\|}$, $\|g\|^2$, $\|g\|^3$, and log $\|g\|$. These features are calculated in each of the multiple MR image channels and input to the discriminative learning method which selects the best features from the multiple input channels for detecting liver boundary points. In the cased of the MR Dixon scan, these features are extracted from each of the opposed and water channels. The candidate point set $Q_p$ is the same for both MR image channels because the points in the MR image channels are in correspondence. Once the trained boundary detector calculates the probability response for each point in $Q_p$ for each boundary point p, each boundary point p is moved to the point in $Q_p$ having the highest frequency response. This procedure is repeated at all levels of the shape pyramid, from the coarsest level to the finest level. FIG. 3 illustrates exemplary probability maps for the liver boundary refinement. As shown in FIG. 3, probability maps 302 and 312 were generated by a trained boundary detector for liver boundary refinement in images 300 and 310, respectively.

Returning to FIG. 1, at step 108, the liver segmentation results are output. For example, liver segmentation results can be output by displaying the liver segmentation results on a display device of a computer system. The liver segmentation results can be displayed by displaying the segmented liver boundary in one or multiple ones of the MR image channels. For example, in the case of the MR Dixon scan, the segmented liver can be displayed in the water image, the opposed image, or both.

Figure 4:
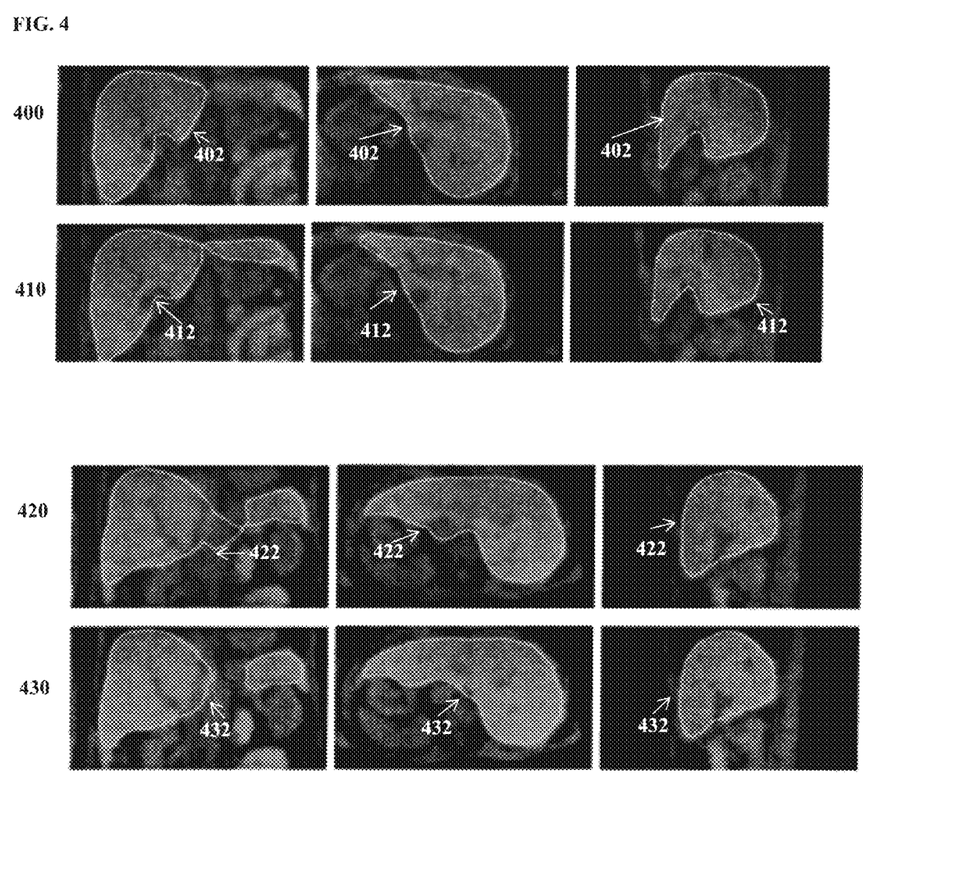
FIG. 4 illustrates exemplary liver segmentation results.

FIG. 4 illustrates exemplary liver segmentation results. As shown in FIG. 4, row 400 shows a segmented liver 402 in a first water channel MR volume segmented using single-channel features from the first water channel MR volume and row 410 shows a segmented liver 412 in the first water channel MR volume segmented using multi-channel features from the water channel and the opposed channel. It can be seen that the segmented liver 412 obtained using the multi-channel features results in a more precise detection of the left liver tip as compared with the segmented liver 402 obtained using the single-channel features. Row 430 shows a segmented liver 432 in a second water channel MR volume segmented using single-channel features from the second water channel MR volume and row 440 shows a segmented liver 442 in the second water channel MR volume segmented using multi-channel features from the water channel and the opposed channel. It can be seen that the segmented liver 442 obtained using the multi-channel features does not contain a false part of the liver that is contained within the boundary of the segmented liver 432 obtained using the single-channel features.

As described above, the method of FIG. 1 utilizes features extracted from multiple channels of a multi-channel MR image for initial MSL-based liver segmentation in step 104 and for liver boundary refinement in step 106. In an alternative embodiment, the initial liver segmentation in the multi-channel MR image can be performed based on features extracted from a single channel (e.g., the water channel of an MR Dixon scan), and then the liver boundary refinement is performed based on multi-channel features extracted from multiple channels of the multi-channel MR image (e.g., the water channel and the opposed channel).

Figure 5:
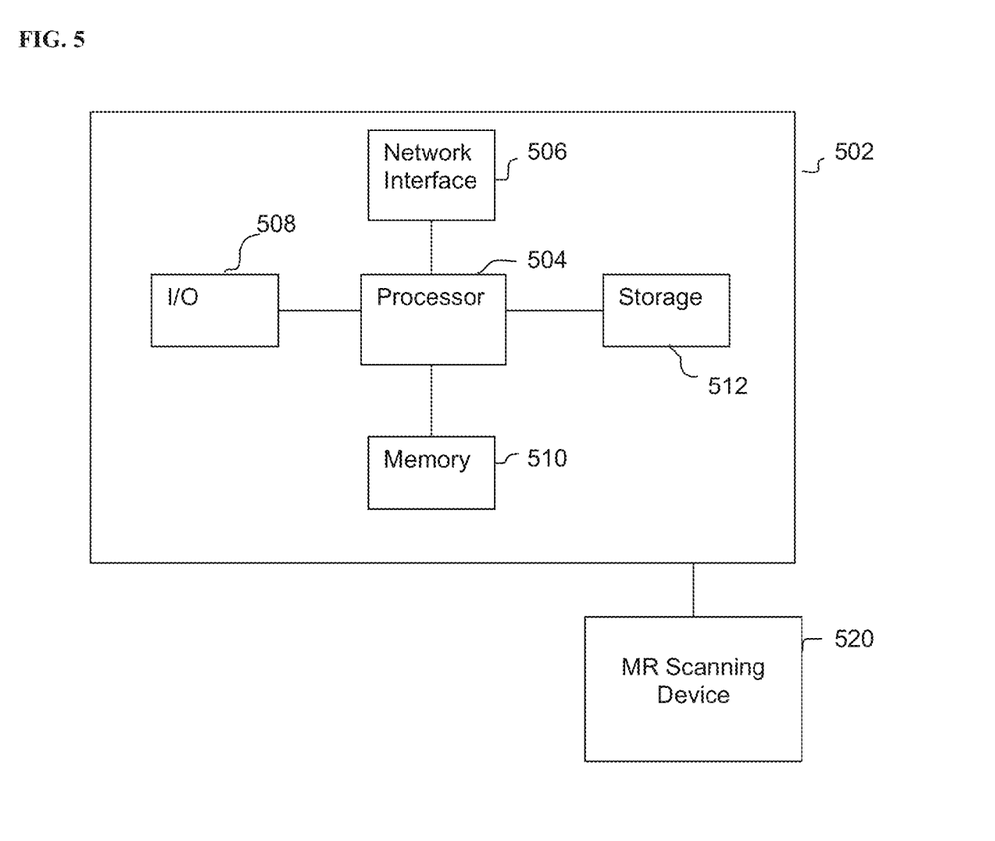
FIG. 5 is a high level block diagram of a computer capable of implementing the present invention.

The above-described methods for segmenting the liver in multi-channel MR images may be implemented on a computer using well-known computer processors, memory units, storage devices, computer software, and other components. A high level block diagram of such a computer is illustrated in FIG. 5. Computer 502 contains a processor 504 which controls the overall operation of the computer 502 by executing computer program instructions which define such operation. The computer program instructions may be stored in a storage device 512, or other computer readable medium (e.g., magnetic disk, CD ROM, etc.) and loaded into memory 510 when execution of the computer program instructions is desired. Thus, the steps of the method of FIG. 1 may be defined by the computer program instructions stored in the memory 510 and/or storage 512 and controlled by the processor 504 executing the computer program instructions. An MR scanning device 520 can be connected to the computer 502 to input the multi-spectral MR images to the computer 502. It is possible to implement the MR scanning device 520 and the computer 502 as one device. It is also possible that the MR scanning device 520 and the computer 502 communicate wirelessly through a network. The computer 502 also includes one or more network interfaces 506 for communicating with other devices via a network. The computer 502 also includes other input/output devices 508 that enable user interaction with the computer 502 (e.g., display, keyboard, mouse, speakers, buttons, etc.). One skilled in the art will recognize that an implementation of an actual computer could contain other components as well, and that FIG. 5 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for liver segmentation in a multi-channel magnetic resonance (MR) image, wherein the multi-channel MR image is obtained using an MR Dixon scan, comprising:
   segmenting an initial liver boundary in the multi-channel MR image; and
   refining the segmented initial liver boundary in the multi-channel MR image based on features extracted from an opposed channel and a water channel of the multi-channel MR image using a trained boundary detector.

2. The method of claim 1, wherein segmenting an initial liver boundary in the multi-channel MR image comprises:
   segmenting the initial liver boundary in the multi-channel MR image based on features extracted from multiple channels of the multi-channel MR image.

3. The method of claim 2, wherein segmenting the initial liver boundary in the multi-channel MR image based on features extracted from multiple channels of the multi-channel MR image comprises:
   segmenting the initial liver boundary in the multi-channel MR image using marginal space learning (MSL) segmentation based on the features extracted from multiple channels of the multi-channel MR image.

4. The method of claim 1, wherein refining the segmented initial liver boundary in the multi-channel MR image based on features extracted from an opposed channel and a water channel of the multi-channel MR image using a trained boundary detector comprises:
   for each of a plurality of boundary points on the initial liver boundary,
      calculating a probability response for each of a set of candidate points along a normal direction from the boundary point using the trained boundary detector based on features extracted from the opposed channel and the water channel of the multi-channel MR image; and
      moving to boundary point to a candidate point having the highest probability response.

5. The method of claim 1, wherein refining the segmented initial liver boundary in the multi-channel MR image based on features extracted from an opposed channel and a water channel of the multi-channel MR image using a trained boundary detector comprises:
   generating a hierarchical shape model based on the segmented initial liver boundary, the hierarchical shape model having a plurality of levels and a respective liver mesh at each of the plurality of levels represents the initial liver boundary at a respective one of a plurality of image resolutions; and
   adjusting boundary points of the respective mesh at each of the plurality of levels of the hierarchical shape model from a coarsest level to a finest level based on features extracted from the opposed channel and the water channel of the multi-channel MR image at the respective image resolution using a respective trained boundary detector for each respective image resolution.

6. The method of claim 1, wherein refining the segmented initial liver boundary in the multi-channel MR image based on features extracted from an opposed channel and a water channel of the multi-channel MR image using a trained boundary detector comprises:
   refining the segmented initial liver boundary based on steerable features extracted from the opposed channel and the water channel of the multi-channel MR image using a training boundary detector.

7. The method of claim 1, wherein segmenting an initial liver boundary in the multi-channel MR image comprises:
   segmenting the initial liver boundary in the multi-channel MR image based on features extracted from the opposed channel and the water channel of the multi-channel MR image.

8. The method of claim 1, wherein segmenting an initial liver boundary in the multi-channel MR image comprises:
   segmenting the initial boundary in the multi-channel MR image based on features extracted from a single channel of the multi-channel MR image.

9. An apparatus for liver segmentation in a multi-channel magnetic resonance (MR) image, wherein the multi-channel MR image is obtained using an MR Dixon scan, comprising:
   means for segmenting an initial liver boundary in the multi-channel MR image; and
   means for refining the segmented initial liver boundary in the multi-channel MR image based on features extracted from an opposed channel and a water channel of the multi-channel MR image using a trained boundary detector.

10. The apparatus of claim 9, wherein the means for segmenting an initial liver boundary in the multi-channel MR image comprises:
    means for segmenting the initial liver boundary in the multi-channel MR image based on features extracted from multiple channels of the multi-channel MR image.

11. The apparatus of claim 9, wherein the means for refining the segmented initial liver boundary in the multi-channel MR image based on features extracted from an opposed channel and a water channel of the multi-channel MR image using a trained boundary detector comprises:
    means for calculating, for each of a plurality of boundary points on the initial liver boundary, a probability response for each of a set of candidate points along a normal direction from the boundary point using the trained boundary detector based on features extracted from the opposed channel and the water channel of the multi-channel MR image; and
    means for moving each of the plurality of boundary points to a candidate point having the highest probability response.

12. The apparatus of claim 9, wherein the means for refining the segmented initial liver boundary in the multi-channel MR image based on features extracted from an opposed channel and a water channel of the multi-channel MR image using a trained boundary detector comprises:
    means for generating a hierarchical shape model based on the segmented initial liver boundary, the hierarchical shape model having a plurality of levels and a respective liver mesh at each of the plurality of levels represents the initial liver boundary at a respective one of a plurality of image resolutions; and
    means for adjusting boundary points of the respective mesh at each of the plurality of levels of the hierarchical shape model from a coarsest level to a finest level based on features extracted from the opposed channel and the water channel of the multi-channel MR image at the respective image resolution using a respective trained boundary detector for each respective image resolution.

13. The apparatus of claim 9, wherein the means for segmenting an initial liver boundary in the multi-channel MR image comprises:
    means for segmenting the initial liver boundary in the multi-channel MR image based on features extracted from the opposed channel and the water channel of the multi-channel MR image.

14. The apparatus of claim 9, wherein the means for segmenting an initial liver boundary in the multi-channel MR image comprises:
    means for segmenting the initial boundary in the multi-channel MR image based on features extracted from a single channel of the multi-channel MR image.

15. A non-transitory computer readable medium storing computer program instructions for liver segmentation in a multi-channel magnetic resonance (MR) image, wherein the multi-channel MR image is obtained using an MR Dixon scan, the computer program instructions when executed by a processor cause the processor to perform operations comprising:
    segmenting an initial liver boundary in the multi-channel MR image; and
    refining the segmented initial liver boundary in the multi-channel MR image based on features extracted from an opposed channel and a water channel of the multi-channel MR image using a trained boundary detector.

16. The non-transitory computer readable medium of claim 15, wherein segmenting an initial liver boundary in the multi-channel MR image comprises:
    segmenting the initial liver boundary in the multi-channel MR image based on features extracted from multiple channels of the multi-channel MR image.

17. The non-transitory computer readable medium of claim 16, wherein segmenting the initial liver boundary in the multi-channel MR image based on features extracted from multiple channels of the multi-channel MR image comprises:
    segmenting the initial liver boundary in the multi-channel MR image using marginal space learning (MSL) segmentation based on the features extracted from multiple channels of the multi-channel MR image.

18. The non-transitory computer readable medium of claim 15, wherein refining the segmented initial liver boundary in the multi-channel MR image based on features extracted from an opposed channel and a water channel of the multi-channel MR image using a trained boundary detector comprises:
    for each of a plurality of boundary points on the initial liver boundary, calculating a probability response for each of a set of candidate points along a normal direction from the boundary point using the trained boundary detector based on features extracted from the opposed channel and the water channel of the multi-channel MR image; and
    moving to boundary point to a candidate point having the highest probability response.

19. The non-transitory computer readable medium of claim 15, wherein refining the segmented initial liver boundary in the multi-channel MR image based on features extracted from an opposed channel and a water channel of the multi-channel MR image using a trained boundary detector comprises:
    generating a hierarchical shape model based on the segmented initial liver boundary, the hierarchical shape model having a plurality of levels and a respective liver mesh at each of the plurality of levels represents the initial liver boundary at a respective one of a plurality of image resolutions; and
    adjusting boundary points of the respective mesh at each of the plurality of levels of the hierarchical shape model from a coarsest level to a finest level based on features extracted from the opposed channel and the water channel of the multi-channel MR image resolution at the respective image resolution using a respective trained boundary detector for each respective image resolution.

20. The non-transitory computer readable medium of claim 15, wherein refining the segmented initial liver boundary in the multi-channel MR image based on features extracted from an opposed channel and a water channel of the multi-channel MR image using a trained boundary detector comprises:
    refining the segmented initial liver boundary based on steerable features extracted from the opposed channel and the water channel of the multi-channel MR image using a training boundary detector.

21. The non-transitory computer readable medium of claim 15, wherein segmenting an initial liver boundary in the multi-channel MR image comprises:
    segmenting the initial liver boundary in the multi-channel MR image based on features extracted from the opposed channel and the water channel of the multi-channel MR image.

22. The non-transitory computer readable medium of claim 15, wherein segmenting an initial liver boundary in the multi-channel MR image comprises:
    segmenting the initial boundary in the multi-channel MR image based on features extracted from a single channel of the multi-channel MR image.

* * * * *